(12) United States Patent
Bailey et al.

(10) Patent No.: US 8,327,428 B2
(45) Date of Patent: Dec. 4, 2012

(54) AUTHENTICATING LINKED ACCOUNTS

(75) Inventors: David W. Bailey, Bellevue, WA (US); Lynn C. Ayres, Bellevue, WA (US); Lin Huang, Redmond, WA (US); Yordan I Rouskov, Kirkland, WA (US); Weiqiang Michael Guo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1312 days.

(21) Appl. No.: 11/565,611

(22) Filed: Nov. 30, 2006

(65) Prior Publication Data
US 2008/0134295 A1 Jun. 5, 2008

(51) Int. Cl.
*H04L 29/06* (2006.01)

(52) U.S. Cl. ............ 726/8; 726/2; 726/3; 726/4; 726/5; 726/6; 726/7; 726/10; 726/17; 726/18; 726/19; 713/168; 713/182; 713/185; 709/217; 709/219; 709/225; 709/229

(58) Field of Classification Search ................ 726/2–10, 726/16–21; 713/168–175, 182–186; 709/217–219, 709/223–229
See application file for complete search history.

(56) References Cited

U.S. PATENT DOCUMENTS

| | | | |
|---|---|---|---|
| 6,014,135 A | 1/2000 | Fernandes | |
| 6,487,584 B1 | 11/2002 | Bunney | |
| 6,512,525 B1 | 1/2003 | Capps et al. | |
| 6,671,682 B1 | 12/2003 | Nolte et al. | |
| 6,745,040 B2 | 6/2004 | Zimmerman | |
| 7,058,817 B1 * | 6/2006 | Ellmore | 713/183 |
| 7,086,008 B2 | 8/2006 | Capps et al. | |
| 7,162,494 B2 | 1/2007 | Arellano | |
| 7,350,229 B1 * | 3/2008 | Lander | 726/8 |
| 7,472,277 B2 | 12/2008 | Halcrow et al. | |
| 7,509,497 B2 * | 3/2009 | Joy et al. | 713/172 |
| 7,530,099 B2 * | 5/2009 | Flurry et al. | 726/8 |
| 7,562,382 B2 * | 7/2009 | Hinton et al. | 726/2 |
| 2003/0120717 A1 | 6/2003 | Callaway et al. | |
| 2003/0233577 A1 | 12/2003 | Bellino | |
| 2004/0148346 A1 | 7/2004 | Weaver et al. | |
| 2005/0032475 A1 | 2/2005 | Mauney et al. | |
| 2005/0049969 A1 * | 3/2005 | Kane | 705/45 |
| 2005/0053206 A1 | 3/2005 | Chingon et al. | |
| 2005/0060532 A1 | 3/2005 | Dorenbosch et al. | |
| 2005/0108329 A1 | 5/2005 | Weaver et al. | |
| 2005/0186977 A1 | 8/2005 | Chiu et al. | |
| 2006/0052091 A1 | 3/2006 | Onyon et al. | |
| 2006/0074806 A1 | 4/2006 | McKegney et al. | |
| 2006/0122967 A1 | 6/2006 | Purkayastha et al. | |

(Continued)

OTHER PUBLICATIONS

Liberty ID-FF Architecture Overview version: 1.2-errata-v1.0 by Cantor et al; Publcisher: Liberty Alliance Project; Year 2003.*

(Continued)

*Primary Examiner* — Taghi Arani
*Assistant Examiner* — Madhuri Herzog
(74) *Attorney, Agent, or Firm* — Lee & Hayes, PLLC

(57) ABSTRACT

Embodiments of authenticating linked accounts are presented herein. In an implementation, an authentication service provides functionality to form links between a plurality of user accounts. A client may then authenticate by providing credentials for one account in a group of linked accounts, and is permitted access to each account in the group of linked accounts based upon the linking. Thus, a single sign-in of a client to one account may permit the client to obtain services for service providers corresponding to multiple linked accounts, without an individual sign-in to each account.

22 Claims, 11 Drawing Sheets

U.S. PATENT DOCUMENTS

| | | | |
|---|---|---|---|
| 2006/0218630 A1* | 9/2006 | Pearson et al. | 726/8 |
| 2006/0265347 A1 | 11/2006 | Caballero-McCann et al. | |
| 2006/0276182 A1 | 12/2006 | Feng | |
| 2006/0281490 A1 | 12/2006 | Dolgas et al. | |
| 2007/0061730 A1 | 3/2007 | O'Mahony et al. | |
| 2007/0121869 A1 | 5/2007 | Gorti et al. | |
| 2008/0167016 A1 | 7/2008 | Swanburg et al. | |
| 2009/0080404 A1 | 3/2009 | Laurila et al. | |
| 2011/0061008 A1 | 3/2011 | Gupta et al. | |

OTHER PUBLICATIONS

Single Sign-On Using Cookies for Web Applications by Vipin Samar; Publisher: IEEE; Year: 1999.*

U.S. Appl. No. 11/227,008, filed on Sep. 15, 2005, Allison O'Mahony, et al., "Multipersona Creation and Management," 31 pages.

U.S. Appl. No. 12/098,805, filed on Apr. 7, 2008, Anoop Gupta et al., "Single Device with Multiple Personas," 35 pages.

Afshar, "Implementing an IMS Based Network—Challenges & Lessons Learned," IEC Communications Forum at NXTcomm in Chicago, IL, AT&T, Jun. 16, 2007, Retrieved on Jun. 18, 2007 at <<http://www.iec.org/events/2007/iec_forums/presentations/pdfs/A_1Siroos_Afshar_AT&T.pdf>>,14 pages.

Miller et al., "Personas: Moving Beyond Role-Based Requirements Engineering," retrieved on Aug. 20, 2007, available at <<http://agile.csc.ncsu.edu/SEMaterials/Personas.pdf>>, 10 pages.

Notice of Allowance for U.S. Appl. No. 11/227,008, mailed on Mar. 24, 2010, Allison O'Mahony, "Multipersona Creation and Management ," 2 pages.

Notice of Allowance for U.S. Appl. No. 11/227,008, mailed on Sep. 9, 2009, Allison O'Mahony, "Multipersona Creation and Management," 7 pages.

Office Action for U.S. Appl. No. 11/227,008, mailed on Mar. 24, 2008, Allison O'Mahony, "Multipersona Creation and Management," 15 pages.

Office Action for U.S. Appl. No. 11/227,008, mailed on May 12, 2009, Allison O'Mahony, "Multipersona Creation and Management," 19 pages.

Office Action for U.S. Appl. No. 12/098,805, mailed on Aug. 9, 2011, Anoop Gupta, "Single Device with Multiple Personas," 19 pages.

Office Action for U.S. Appl. No. 12/098,805, mailed on Mar. 31, 2011, Anoop Gupta, "Single Device with Multiple Personas," 17 pages.

Thomas et al., "Models, Protocols, and Architectures for Secure Pervasive Computing: Challenges and Research Directions," In the Proceedings of the Second IEEE Annual Conference on Pervasive Computing and Communications Workshops, 2004, 5 pages.

Wardlaw, "Intelligence and Mobility for BT's Next Generation Networks," BT Technology Journal, Jan. 2005, vol. 23, No. 1, pp. 28-47.

* cited by examiner

AUTHENTICATING LINKED ACCOUNTS

BACKGROUND

A user has access to a variety of different types of services, both locally and remotely over a network. For example, the user may shop at an ecommerce web site, write in a "blog", read and respond to messages in a message board, communicate using instant messages, send and receive email, and so on. Users may choose to have separate accounts with the same or different service providers which are used for the interactions with different social groups. For example, the user may interact with a variety of social groups via instant messages and/or other services, including work contacts, college friends, high school friends, family friends, family members, and so forth. The user may have a "work" account for interactions with work contacts and a separate "home" account for interactions with friends and family members. To interact with the variety of services, the user may be required or find it desirable to "sign-in" to a particular account with a service by providing sign-in credentials, such as a username and password. However, once the user is logged into a particular account in traditional systems, the user is typically limited to accessing data and services of the particular account. Thus, to access different accounts for different interactions the user may be limited to a "sign-off" from one account and providing additional sign-in credentials to "sign-in" to another account, which may be time consuming and frustrating for the user.

SUMMARY

Authenticating linked accounts techniques are described. In an implementation, a linking interface is exposed via an authentication service through which a user may specify a plurality of accounts which are to be linked. The authentication service can store data describing linked accounts based upon the users' selections. Authentication to one account of a set of linked accounts may then provide access to each of the linked accounts with a single presentation of credentials. Service providers may interact with the authentication service to reference linked accounts and data such that a client authenticated to one account may receive services corresponding to one or more other accounts which have been linked to the one account.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Figure 1:
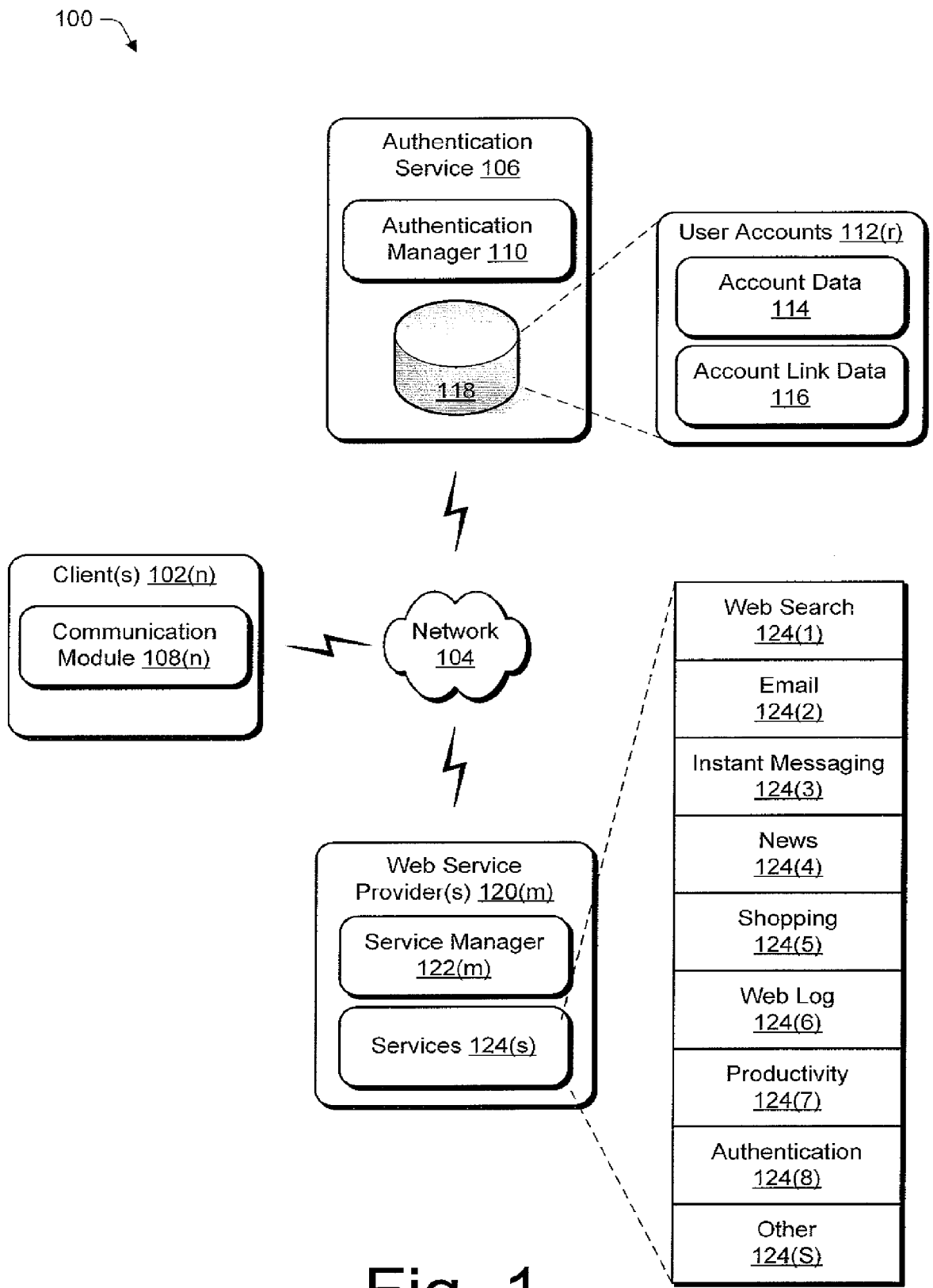
FIG. 1 is an illustration of an environment in an implementation that is operable to employ authenticating linked accounts.

A user may have various different user accounts for different interactions via a network. For instance, a user may have a "Work" account to access business related e-mail and services and a "Personal" account to interact with friends and family via instant messaging, e-mail, forums, to access Internet content, and so forth. However, in order to access different accounts for different interactions using traditional account log-in techniques, the user may have to a "sign-off" from one account and then provide additional sign-in credentials to "sign-in" to another account, which may be time consuming and frustrating for the user.

Accordingly, authenticating linked accounts techniques are described in which an interface can be exposed to permit a user to link together a plurality of accounts, such that authentication to one of the linked accounts provides access to each linked account. In an implementation, a client interacts with an authentication service to indicate which accounts are to be linked. The authentication service may expose one or more interfaces through which a client may specify accounts to link (or de-link), and which causes the authentication service to store data describing the link. For example, a user may choose to link the "Work" account and the "Personal" account, and the authentication service can then store account linking data to describe the link, such as a unique link identifier matched to account identifiers for the "Work" account and the "Personal" account.

When a user or client is authenticated via the authentication service to one account in a set of linked accounts, the corresponding authentication data may include account linking data to reference the linked accounts. For instance, if a user provides valid credentials for the "Work" account, the authentication service can form authentication data, such as an authentication token, which may be used as proof of identity to the "Work" account. The authentication data (e.g., the token) may also include data to reference the linked accounts, such as the unique link identifier. When the user presents an authentication token to access services from one or more service providers, the service providers may utilize a link identifier included in the authentication token to identify linked accounts and to provide interactions with services corresponding to each linked account, based upon client authentication to the one account. Thus, the user may perform a single "sign-in" to the "Work" account, and based on the account linking, may receive access to each linked account (e.g., may interact with services and content corresponding to the "Work" account and the "Personal" account).

In the following discussion, an exemplary environment is first described that is operable to employ the authenticating linked accounts techniques described, as well as other techniques. Exemplary procedures are then described which may be employed by the exemplary environment, as well as in other environments.

Exemplary Environment

FIG. 1 is an illustration of an environment 100 in an exemplary implementation that is operable to employ authenticating linked accounts techniques. The illustrated environment 100 includes one or more clients 102(n) (where "n" can be any integer) communicatively coupled over a network 104 to an authentication service 106. The one or more clients 102(n) may be configured in a variety of ways for accessing resources via network 104. For example, one or more of the clients 102(n) may be configured as a computing device, such as a desktop computer, a mobile station, an entertainment appliance, a set-top box communicatively coupled to a display device, a wireless phone, a game console, and so forth. Thus, the client devices 102(n) may range from full resource devices with substantial memory and processor resources (e.g., personal computers, game consoles) to low-resource devices with limited memory, processing and/or display resources (e.g., traditional set-top boxes, hand-held game consoles, wireless phones). Additionally, one or more of the client devices 102(n) may describe logical clients that include software and/or devices. Further, the network 104 can be implemented as a wide variety of configurations. For example, the network 104 may include a wide area network (WAN), a local area network (LAN), a wireless network, a public telephone network, an intranet, the Internet, and so on. Further, although a single network 104 is shown, the network 104 may be configured to include multiple networks.

The clients 102(n) are each illustrated as including a respective communication module 108(n) which may be configured to provide a variety of functionality. For example, a communication module 108 may be configured to send and receive email. Email employs standards and conventions for addressing and routing such that the email may be delivered across the network 104 utilizing a plurality of devices, such as routers, other computing devices (e.g., email servers), and so on. In another example, a communication module 108 may be configured to send and receive instant messages. Instant messaging provides a mechanism by which clients 102(n), when participating in an instant messaging session, can send text messages to each other. Any of the clients 102(n) can be configured to communicate one to another via network 104. The instant messages are typically communicated in real time, although delayed delivery may also be utilized, such as by logging the text messages when one of the clients 102(n) is unavailable (e.g., offline). Thus, instant messaging may be thought of as a combination of e-mail and Internet chat in that instant messaging supports message exchange and is designed for two-way live chats. In an embodiment, a communication module 108 may be configured to provide Web browsing functionality to access Web based resources (service and content), and for client 102(n) interactions with the resources which may be provided via the network 104.

Each of the clients 102(n) may also include one or more application modules (not shown) which may be configured to provide a variety of functionality to the clients 102(n). Functionality provided by application modules may include, but is not limited to, home/office/business productivity functionality such as word processing, database, spreadsheet, and presentation functionality; software development functionality such as development interfaces, tools, management, and compilation; and other computing functionality such as graphic design, and media management, editing, viewing, and/or playback. A variety of other examples are also contemplated.

Communication modules 108(n) may further be configured to interact with the authentication service 106 to gain access to resources (e.g., content and services) provided via network 104. Authentication service 106 is illustrated having an authentication manager module 110 which represents functionality to manage one or more user accounts 112(r) (where "r" may be any integer); to communicate via network 104; to authenticate clients 102(n) to corresponding user accounts 112(r) (e.g., to determine that clients 102(n) seeking access to resources provided via network 104 "are who they say they are"); and so on. User accounts 112(r) may each correspond to clients 102(n) and/or users of the clients 102(n), and may be associated with a variety of account data 114 that is utilized for interaction by the clients 102(n) with corresponding network resources. For example, one of the accounts 112(r) may correspond to a particular client 102(n) and/or user and may include service authorizations specifying resources with which the account 112(r) and/or user is permitted to interact; account credentials (e.g., user name and password); user profile data; and so forth. Further, in accordance with one or more described embodiments, the authentication service 106 and/or authentication manager module 110 may include functionality to form, manage, and/or maintain account link data 116 which describes relationships between user accounts 112(r) which link respective ones of the accounts 112(r) one to another. In an implementation, authentication manager 110 module may manage storage 118 (for example, a user account database) for user accounts 112(r), account data 114, and/or account link data 116.

In an implementation, clients 102(n) may be communicatively coupled via network 104 to one or more service providers 120(m) (where "m" can be any integer). Each of service providers 120(m) is illustrated as having a respective service manager 122(m) module, which is representative of functionality used by the service providers 120(m) to manage access to one or more services 124(s) over the network 104; performance of the services 124(s); and so on. Although illustrated separately, the functionality represented by the service manager 122(m) module may be incorporated within the services 124(s) themselves.

One or more of service providers 120(m) may be configured as a provider of a web service suite. A service provider 120(m) configured as a web service suite integrates a plurality of services 124(s) that are accessible via the network 104. Thus, the service provider 120(m) provides a full suite of services rather than individual or only a limited number of services. In an implementation, a user registers (e.g., "signs-up" for an account 112(r)) a single time with the service provider 120(m) and is provided access to all of the services 124(s) of the suite during a session. The user has access via a particular one of the accounts 112(r) to all of the services 124(s) whether the user actually uses the services 124(s) or not, and need not register individually for each different desired service 124(s). Thus, each of the accounts 112(r) may have full privileges and access to an entire suite of services 124(s) provided by one or more service providers 120(m). A user, when interacting via an account 112(r), may simply select one service 124 and then any additional services 124(s) provided by the websuite service provider 120(m) without requiring the client 102(n) to provide additional credentials (e.g., additional account set-up). In effect, the user turns on the full suite of services 124(s) upon registration (creating an account 112(r)) with a service provider 120. While a service provider 120 configured to provide a Web service suite has been described, it is contemplated that service providers 120(m) may range from those providing a single one of services 124 (e.g., an email provider) up to a provider of a full suite of services 124(s).

A wide variety of functionality may be made available via the services 124(s). For example, the services 124(s) may include a Web search 124(1) service (e.g., a search engine) provided to search the Internet, an email 124(2) service provided to send and receive e-mail, and an instant messaging 124(3) service to provide instant messaging between the clients 102(n). Additional examples include a news 124(4) service, a shopping (e.g., "ecommerce") 124(5) service, and a web log 124(6) service. Further, productivity 124(7) services may also be provided, such as word processing, spreadsheets, presentations, drawings, note-taking, and so on. For instance, network access may be given to one or more of clients 102(n) to applications that have been traditionally executed locally on the clients 102(n). Therefore, execution of the application modules may be performed remotely at the service providers 120(m) and results of the execution may be communicated over the network 104 to one or more of the clients 102(n). An authentication service 124(8) integrated as part of a service provider 120(m) may also be provided to authenticate clients 102(n) to access other services, which may include other services provided by one or more of the service providers 120(m). Although a few examples of services 124(s) have been described, it should be apparent that a wide variety of other services are also contemplated, a few examples of which include a community based forum for topical discussions and support; a marketplace for exchange of good and services; a travel service; a computer health and maintenance service to provide one or more of virus protection, spyware protection, software updates, and so forth; a map service; and so on.

In an implementation, the service providers 120(m) via the service manager modules 122(m) are configured to redirect clients 102(n) seeking access to services 124(s) to an authentication service 106 for authentication. Thus, rather than authenticate directly with the service providers 120(m), the service providers 120(m) may utilize a separate authentication service 106 for authentication, thereby "offloading" authentication to the authentication service 106. In this way, the service providers 120(m) may be configured to understand whether the clients 102(n) were successfully authenticated by the authentication service 106, but do not need to "understand" how the authentication was performed. Authentication via a service may be limited to a particular service provider 120 and/or service 124, such that authentication would be valid only for the one service provider 120 and/or for a particular service 124. Alternatively, a single authentication with an authentication service 106 may permit access to a plurality services 124(s) provided by one or more of the service providers 120(m). In other words, a single "sign-in" (e.g., verification of credentials) corresponding to one of the accounts 112(r) via the authentication service 106 may authenticate a client 102 (i.e., provides proof of identity of the client 102) for access to a plurality of services 124(s) corresponding to the one of the accounts 112(r).

Further, the account link data 116 may be used to manage authentication of users to accounts which are linked one to another. For instance, a user at a client 102 having two separate accounts "Work" and "Friends" may interact with the authentication service 106 via network 104 to link the accounts one to another in a linked group (e.g., to create a set of linked accounts). Then, upon providing credentials corresponding to one of the accounts "Work", the user receives access to each of the accounts, "Work" and "Friends". The user through a client 102 may then interact with one or more service providers 120(m) to access services 124(s) which correspond to either of the linked accounts "Work" and "Friends". The user may be authenticated for interaction with multiple service providers 120(m) based upon a single "sign-in". Further, a single "sign-in" to one of the linked accounts (e.g., "Work") allows the user to access each of the separate user accounts 112(r) which are linked together based on the account link data 116. Thus, once a group of accounts 112(r) are "linked" by account link data 116, access may be obtained to each account in the group by a single authentication to any one of the accounts 112(r) which are "linked" in the group. Further description of techniques for linking of user accounts and authenticating linked accounts may be found in the discussion of FIGS. 2-11 below.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the authenticating linked accounts techniques described below are platform-independent, meaning that the techniques may be implemented on a variety of commercial computing platforms having a variety of processors.

Figure 2:
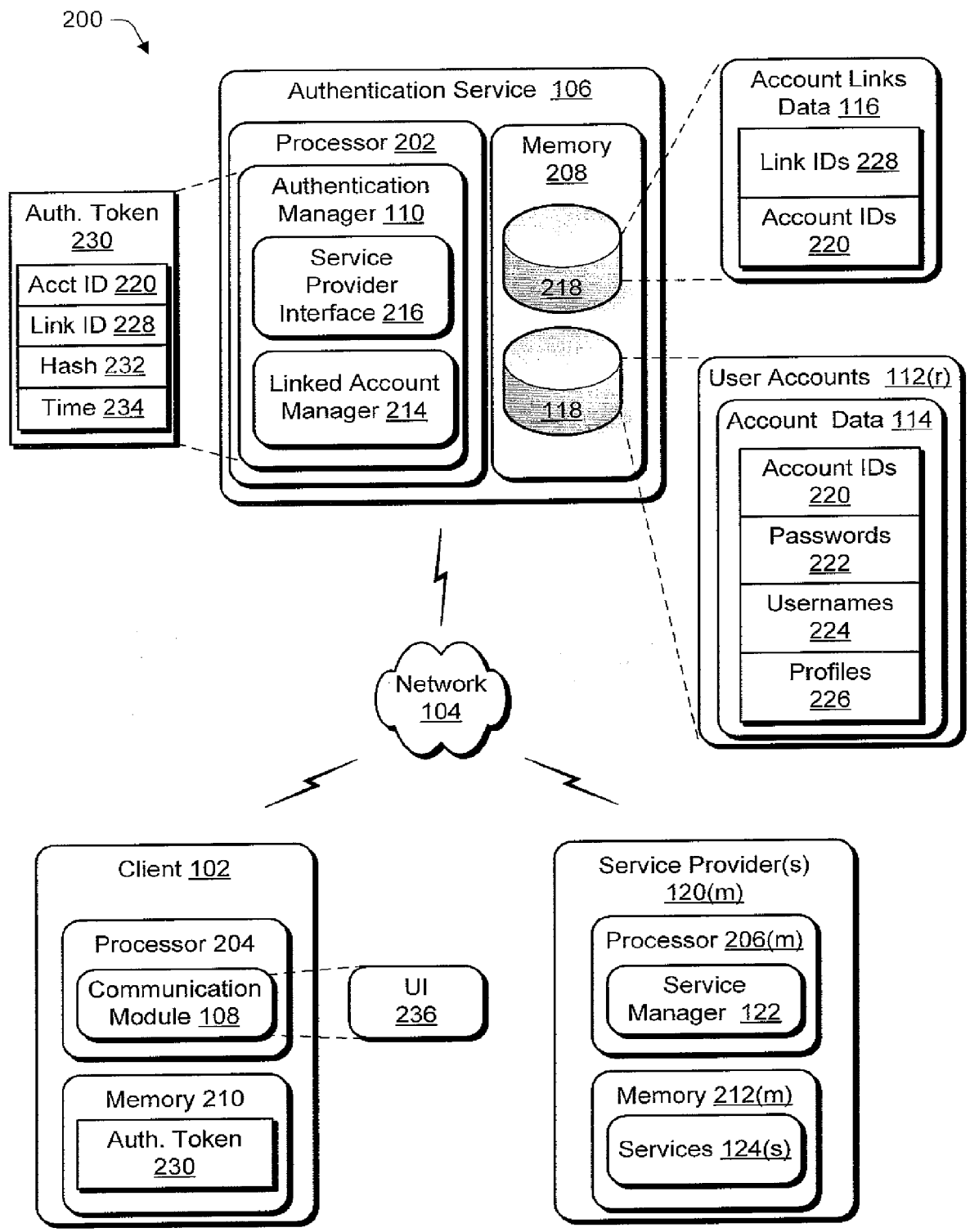
FIG. 2 is an illustration of a system in an exemplary implementation showing a client and services of FIG. 1 in greater detail.

FIG. 2 is an illustration of a system 200 in an exemplary implementation showing an authentication service 106, a client 102, and service providers 120(m) in greater detail. The authentication service 106 and service providers 120(m) each may be implemented via one or more servers. The client 102 which includes a respective communication module 108 may represent any of the clients 102(n) depicted in FIG. 1 which is implemented as a client device. Each of the authentication service 106, client 102, and service providers 120(m) is depicted as including a respective processor 202, 204, 206(m) and a memory 208, 210, 212(m).

Processors are not limited by the materials from which they are formed or the processing mechanisms employed therein. For example, processors may be comprised of semiconductor(s) and/or transistors (e.g., electronic integrated circuits (ICs)). In such a context processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Although a single processor 202, 204, 206(m) is depicted for each of the authentication service 106, client 102, and service providers 120(m), multiple processor arrangements are contemplated such as processors for different servers providing the authentication service 106, or a processor core of client 102 having a variety of processing devices. Additionally, although a single memory 208, 210, 212(m) is shown for each of the authentication service 106, client 102, and service providers 120(*m*), a wide variety of types and combinations of memory may be employed, such as random access memory (RAM), hard disk memory, removable medium memory, and other computer-readable media.

Authentication manager 110 module is depicted as executed on processor 202 of authentication service 106 and is also storable in memory 208. Authentication manager 110 module is further depicted as including as sub-modules a linked account manager 214 module and a service provider interface 216 module. Linked account manager 214 represents functionality to create, manage and maintain links between the accounts 112(*r*). For instance, the linked account manager 214 may be executed via processor 202 to expose one or more application programming interfaces (API) through which a client 102(*n*) may interact to specify accounts 112(*r*) to link together. Such interactions may include but are not limited to linking of accounts, de-linking of accounts, indicating particular aspects or data to share or not share between linked accounts, setting linked account preferences, and so forth.

The service provider interface 216 represents functionality to provide service providers 120(*m*) interactions with user accounts data 114 and/or accounts link data 116. For instance, one or more of service providers 120(*m*) may access the accounts links data 116 to understand a group of linked accounts and may obtain account data 214 corresponding to those accounts, such as to form a user interface to represent data for a group of linked accounts. In an implementation, the service provider interface 216 may be configured to expose an application programming interface which is callable by service providers 120(*m*) to identify linked accounts and to access corresponding data. In another implementation, the service provider interface 216 may permit a service provider to expose a switching control in a user interface selectable to switch the data rendered in the user interface from data corresponding to one account in a group of linked accounts to data corresponding to another account the group of linked accounts.

User accounts 112(*r*) and associated user account data 114 is illustrated as stored in storage 118 in memory 204 of authentication service 106. A variety of account data 114 associated with each user account 112(*r*) is contemplated examples of which include but are not limited to unique account identifiers 220, a password 222, a username 224, and a variety of user profile data 226 such as preferences, a user tile or graphic account representation, user interface elements, service authorizations, billing information, and so forth. FIG. 2 illustrates an embodiment in which the accounts links data 116 is illustrated as maintained in storage 218 (e.g., a database) of memory 204 which is separate from the user accounts data 114 maintained in storage 118. Naturally, storage 118 and 218 may represent components of a common data system, such as separate tables or sets of tables in a database configured to maintain user accounts 112(*r*). In an implementation, accounts links data 116 may be configured as a unique link identifier 228 which is matched to one or more user account identifiers 220, such as in a database table. Thus, the link identifier 228 may be used to reference a group of accounts 112(*r*) which are linked one to another. Thus, when authentication via authentication service 106 to one of the accounts 112(*r*) occurs, the link identifier may be referenced to determine which other accounts 112(*r*) are "linked". In this way, a user by specifying "linked accounts" may pre-authorize a single "sign-in" to permits access to and/or authenticate the linked accounts. A variety of other arrangements are also contemplated. In an embodiment, rather than maintain accounts links data 116 separately from account data 114, a link identifier 228 may be stored as part of account data 114 for each account 112(*r*), and may be referenced from the user account data 114. Those skilled in the art will appreciate a variety of other arrangements to specify a relationship in a stored data record which are suitable to define a relationship between separate user accounts and thereby create "linked accounts".

One technique to authenticate linked accounts involves including account links data 116 in authentication tokens 230 which may be issued to a client 102 upon successful authentication to one of the "linked" accounts 112(*r*). Account links data 116 may be used by parties (e.g., service providers 120(*m*)) relying upon the authentication tokens 230 for proof of identity to understand that a "linked" account exists and to provide services 124(*s*) corresponding to each account which is "linked", based upon the single authentication token 230. Thus, authentication token 230 which is issued for one of the accounts 112(*r*) may be sufficient to access several separate accounts 112(*r*) which are linked via account link data 116, and upon authentication to a single one of the "linked" accounts.

In an implementation, authentication tokens 230 issued in response to successful authentication contain the link identifier 228 though which "linked" accounts may be referenced, for instance to obtain or understand the set of account identifiers 220 matched to the link identifier 228. Authentication manger 110 is depicted as forming an authentication token 230 which includes an account identifier 220 of the authenticated account (the particular account for which credentials are provided and verified), and the corresponding link identifier 228. Authentication token 230 may be communicated via network 104 to a client 102 which is illustrated as storing an exemplary authentication token 230 in memory 210. Client 102 may present the token 230 to one or more service providers 120(*m*) as proof of identity to access corresponding services 124(*s*). Based upon the link identifier 228, service provider 120(*m*) may provide services 124(*s*) corresponding to one or more or the "linked accounts", without additional presentation of credentials. For instance, a service provider 120(*m*) may produce a user interface 236, or data sufficient to form a user interface 236 based upon account link data 116. The user interface 236 may be configured for interactions with linked accounts which are identified via a link identifier 228 provided by a client 102 in an authentication token 230. The user interface 236 (or data) may be communicated to a client 102 via network 104 to be rendered by the client 102. Communication module 108 of client 102 in FIG. 2 is illustrated as receiving and outputting an exemplary user interface 236.

Additionally the authentication token may include a hash 232 based upon each of the "linked" account identifiers 220 and/or a time stamp 234 which indicates the latest update of the account links data 116. The hash 232 and/or time stamp 234 may be used by a relying party (e.g., the service provider 120(*m*)) to determine when the authentication token 230 expires and/or to determine when account link data 116 which may be cached by the relying party may need to be updated. Further discussion of exemplary techniques suitable to perform linking of user accounts and/or authenticating linked accounts in one or more embodiment, as well as exemplary user interfaces may be found in reference to the following figures.

Exemplary Procedures

The following discussion describes techniques for linking of user accounts and authenticating linked accounts that may be implemented utilizing the previously described systems, interfaces, and devices. Reference will be made in the course of the discussion of the following procedures to the environment depicted in FIG. 1 and the system depicted in FIG. 2. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 3:
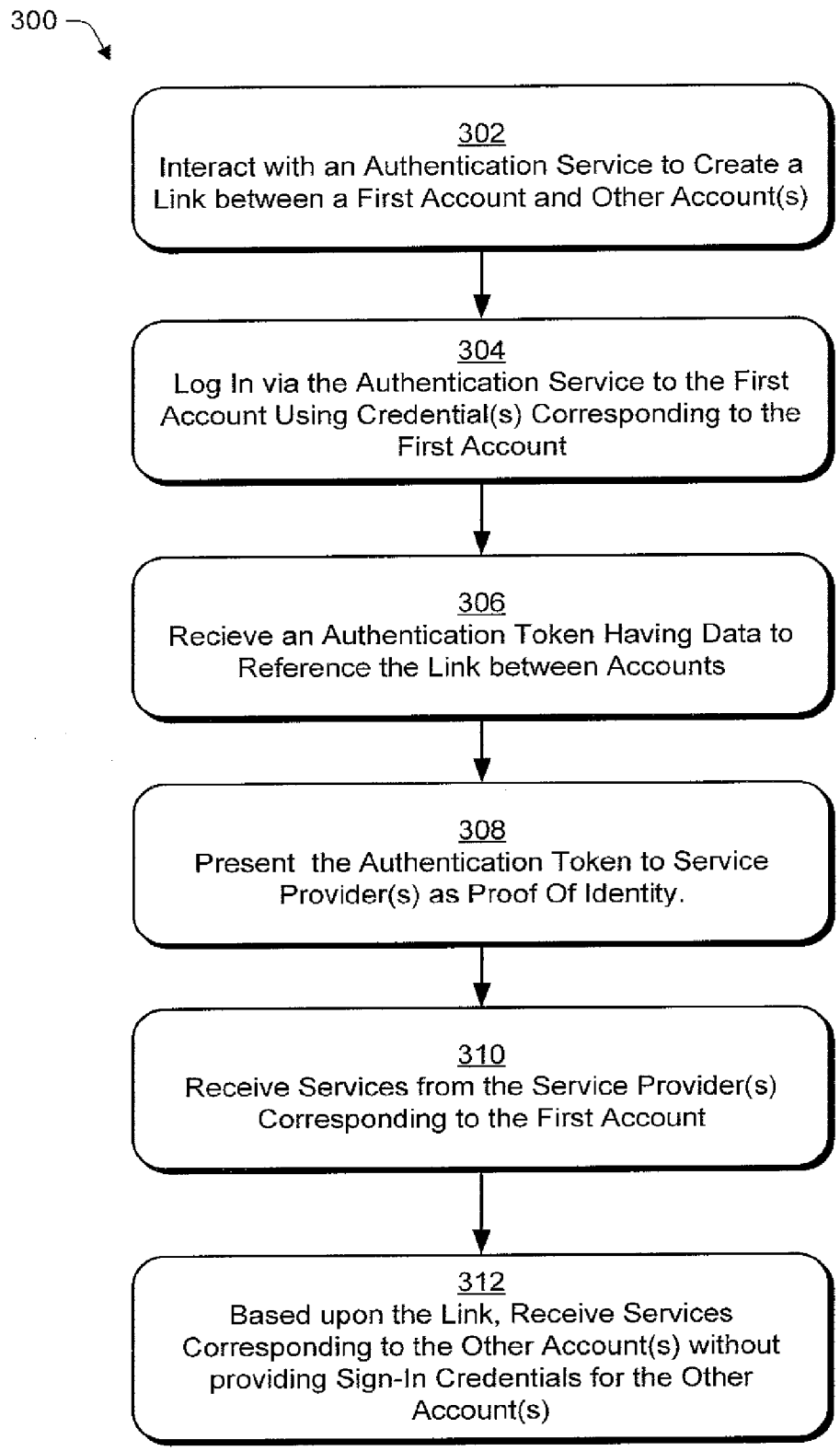
FIG. 3 depicts a procedure in an exemplary implementation in which a client links accounts and authenticates to the linked accounts.

FIG. 3 depicts a procedure 300 in an exemplary implementation in which a client forms and accesses linked accounts. Interaction with an authentication service is initiated to create a link between a first account and one or more other accounts (block 302). For the purpose of example, assume a user "Bob" has three accounts "Bobwork", "BobHome", and "BobAlt" which may be with the same or different service providers 120(m). "Bob" may use these three accounts for different purposes and/or interactions such as one account for work, another for friends and family, and another for internet commerce. It may be convenient for "Bob" to link the separate accounts, such that "sign-in" to one of the accounts may provide access to each account, without further presentation of credentials. In an implementation, an authentication manager 110 module of authentication service 106 depicted in FIG. 2 may include functionality through which a client 102 may specify accounts 112(r) to link together one to another. For instance, authentication manager module 110 may expose a link application programming interface (Link API), or other network 104 interface, through which a client 102 may link accounts. In an implementation, the Link API may be configured according to Simple Object Access Protocol (SOAP) or other suitable communication protocol. To link accounts, a client 102 may access the Link API and designate accounts 112(r) to link, such as by providing account identifiers, account credentials, (user name and password), and so forth for each account to be linked. In response, the Link API may cause account link data 116 data to be formed and/or stored to form a link between the specified accounts 112(r). For example, the Link API may cause account link data 116 to be formed and stored in memory 208 as depicted in FIG. 2 to create a set of linked accounts. Thus, "Bob" may interact with authentication service 106 to specify a link between the three accounts "Bobwork", "BobHome", and "BobAlt". In an implementation, account link data 116 data forming the link between the three accounts "Bobwork", "BobHome", and "BobAlt" may include a link identifier 228 matched to account identifiers 220 for each of the "linked" accounts 112(r).

Then, the client logs in via the authentication service to the first account using one or more credentials corresponding to the first account (block 304). For example, the user "Bob" may authenticate (e.g., "sign-in" by providing credentials such as a username and/or password) to one of the linked accounts, such as authenticating to the account "BobWork" via the authentication service 106 in FIG. 2. Upon successful verification of credentials, the client receives an authentication token having data to reference the linked accounts (block 306). In the preceding example, authentication service 106 in the embodiment of FIG. 2 may execute authentication manager 110 module on processor 202 to verify the credentials provided by "Bob" and to form an authentication token 230 which corresponds to the account "BobWork". For instance, the authentication token may include an account identifier 220 corresponding to "BobWork". The authentication token 230 may also be formed including account link data 116 to indicate a link relationship, such as a link identifier 228 which links the accounts "Bobwork", "BobHome", and "BobAlt". The authentication manger 110 module may then communicate the authentication token 230 to a client 102 via network 104, which may be received via communication module 108 executed on processor 204 of the client 102.

The authentication token is presented to one or more service providers as proof of identity (block 308). The client receives services from one or more service providers corresponding to the first account (block 310). The client, based upon the link, also receives services corresponding to the one or more other accounts, without providing credentials for the one or more other accounts (block 312).

Continuing the above example, "Bob" may wish to access service 124(s) corresponding to one or more service provider 120(m), and or one or more of the linked accounts "Bobwork", "BobHome", and "BobAlt". For example, assume Bob wishes to read email for each account, send an instant message via "BobHome", and buy a present for his nephew via "BobAlt". "Bob" via a client 102 may present the authentication token 230 as proof of identity at one or more service providers 120(m) to obtain the various services 124(s). The service providers 120(m) relying on the authentication token 230 may understand that "Bob" has successfully authenticated to the account "BobWork" and may provide corresponding services 124(s) based upon this authentication. Further, based upon a link identifier 228 included with the authentication token 230, the service providers 120(m) may understand that "BobWork" is linked to one or more other accounts. Thus, one of more of the service providers 120(m) may interact with the authentication service to determine which accounts are linked, such as to understand the link to the accounts "BobHome", and "BobAlt". Then, the service providers 120(m) may provide services corresponding to the accounts "BobHome", and "BobAlt" based upon the linking of the accounts, and without "Bob" providing credentials for these other accounts. In other words, a user (or client 102), upon authentication to one account, may be provided access to each account in a set of linked accounts based upon the account linking. Thus, the user may access services and content corresponding to the multiple linked accounts, upon a single "sign-in" (e.g., a single verification of credentials) to one of the linked accounts.

Figure 4:
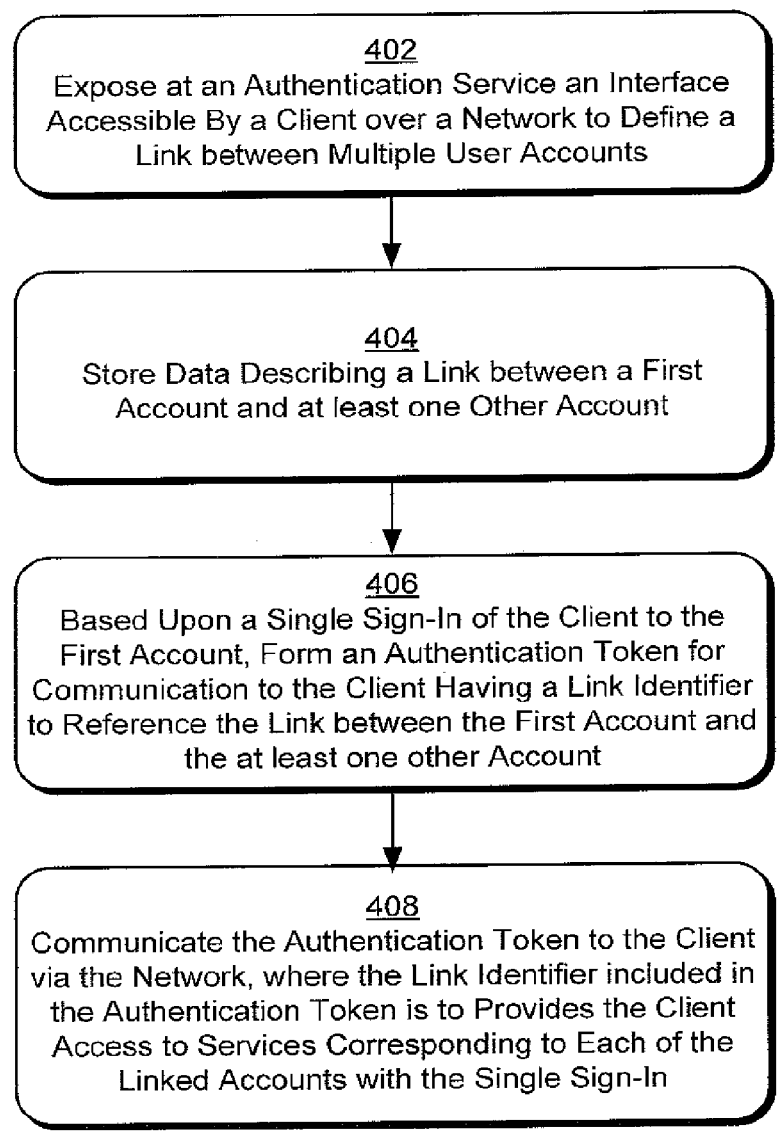
FIG. 4 depicts a procedure in an exemplary implementation in which an authentication service forms an authentication token having account linking data to reference linked accounts.

FIG. 4 depicts a procedure 400 in an exemplary implementation in which an authentication service forms an authentication token having account linking data to reference linked accounts. An authentication service exposes an interface accessible by a client over a network to define a link between a plurality of user accounts (block 402). For instance, the authentication manger 110 module may expose the Link API previously described, which is accessible via a client 102 to form links between various accounts. The accounts which are linked may be newly formed or existing accounts, accounts with different service providers, and so forth. The accounts may each be full featured accounts with the service providers 120(m) which each have privileges the same as other (non-linked) accounts of the service providers 120(m). Thus, the accounts may each have separate credentials, may be accessed separately, and may have different service authorizations, profiles, account preferences, and so on. The accounts may even be associated with different users. For instance a family, group of co-workers, or group of friends may choose to link their individual accounts using the described linking techniques. Thus, it is contemplated that links may be formed between a variety of different types of users accounts.

Data is stored describing a link between a first account and at least one other account (block 404). For example, if Account A is linked with Accounts B and C by a client accessing an exposed Link API, the Link API may respond by creating a database record (e.g., account links data 116) having at least a unique link identifier 228 which is matched to an account identifier 220 for each of accounts A, B, C. Thus, the account identifiers 220 may be used to look-up the corresponding the link identifier 228 and vice versa. Additionally or alternatively, a unique link identifier 228 may be stored with account data 114 for each account A, B, C and the link between the accounts may be determined by matching the link identifier 228 for each account.

Based upon a single sign-in of the client to the first account, an authentication token is formed for communication to the client having a link identifier to reference the link between the first account and the second account. (block 406). In the preceding example, a client 102 may "sign-in" to any one of accounts A, B or C and an authentication token 230 corresponding to the one account is formed in response, such as by the authentication manger 110 module executed on a processor 202. The authentication manger 110 module may reference the stored accounts link data 116 to determine a corresponding link identifier 228 which is also included in the authentication token 230.

The authentication service communicates the token to the client via the network, wherein the link identifier included in the authentication token is to provide the client access to services corresponding to each of the linked accounts with the single sign-in. (block 408) For instance, a relying party (e.g., a service provider relying on the authentication token 230 as proof of a client's identity) may use the link identifier 228 to understand that linked accounts exist and to reference the linked accounts and/or corresponding data. Thus, one or more of the service providers 120(m) may permit access to services 124(s) corresponding to accounts A, B and C based upon the authentication token 230 issued upon authentication to any one of accounts A, B or C and the account links data 116 which links the accounts. Thus, a client 102 may access a plurality of linked user accounts with a single "sign-in" to one of the linked accounts.

Figure 5:
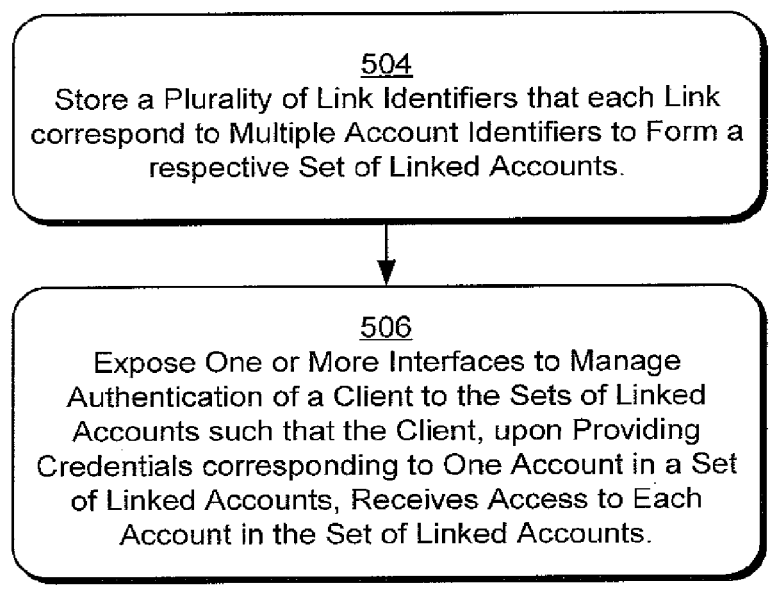
FIG. 5 depicts a procedure in an exemplary implementation in which an authentication service exposes one or more interfaces to manage authentication to linked accounts.

FIG. 5 depicts a procedure 500 in an exemplary implementation in which authentication service exposes one or more interface to manage authentication to linked accounts. A plurality of link identifiers are stored, each link identifier corresponding to a plurality of account identifiers to form a respective set of linked accounts (block 502). One or more interfaces are exposed to manage authentication of a client to the set of linked accounts, such that the client upon providing credentials corresponding to one account in the set of linked accounts, receives access to each account in the set of linked accounts (block 504). For example, a variety of interfaces are contemplated which may be incorporated with an authentication service 106 to manage linked accounts and authentication to linked accounts. The one or more interfaces may be implemented via one or more of the authentication manager 110, linked account manager 214, service provider interface 216 of FIG. 2, and/or as stand alone modules. For example, the one or more interfaces may include functionality to link accounts, such as the Link API previously described may be incorporated with the linked account manager 214 of FIG. 2. Another example of functionality which may be provided by the one or more interfaces is functionality to de-link accounts. For instance, the de-linking functionality may be integrated with the Link API or may be implemented as a separate module of the linked account manager 214 or authentication service 106, such as a De-Link API. A client 102 accessing the De-Link API may indicate or select one or more linked accounts to remove from a set of linked accounts. De-Link API may respond by removing the associated account identifiers 220 from account linking data 116 corresponding to the set of linked accounts. The de-linked account or accounts may then be used as separate accounts, without the linking feature.

In an implementation, the service provider interface 216 depicted in FIG. 2 may represent a variety of functionality for interactions between authentication service 106 and service providers 120(m) to manage authentication of linked account. Thus, service provider interface 216 may include one or more interfaces to provide functionality by which a service provider 120(m) may identify linked accounts using a link identifier 228 obtained from an authentication token 228 and may access corresponding data to form a user interface for the linked accounts, further discussion of which may be found in relation to FIG. 6-8. In another example, service provider interface 216 may include one or more interfaces to provide functionality to cause switching between linked accounts. In an embodiment, an interface is provided which receives a user selection of one account in a set of linked accounts and in response overwrites data in authentication tokens to correspond to the selected account, further discussion of which may be found in relation to FIGS. 9-11. Thus, an authentication service 106 may expose one or more interface through which authentication of a client to the set of linked accounts is managed.

Figure 6:
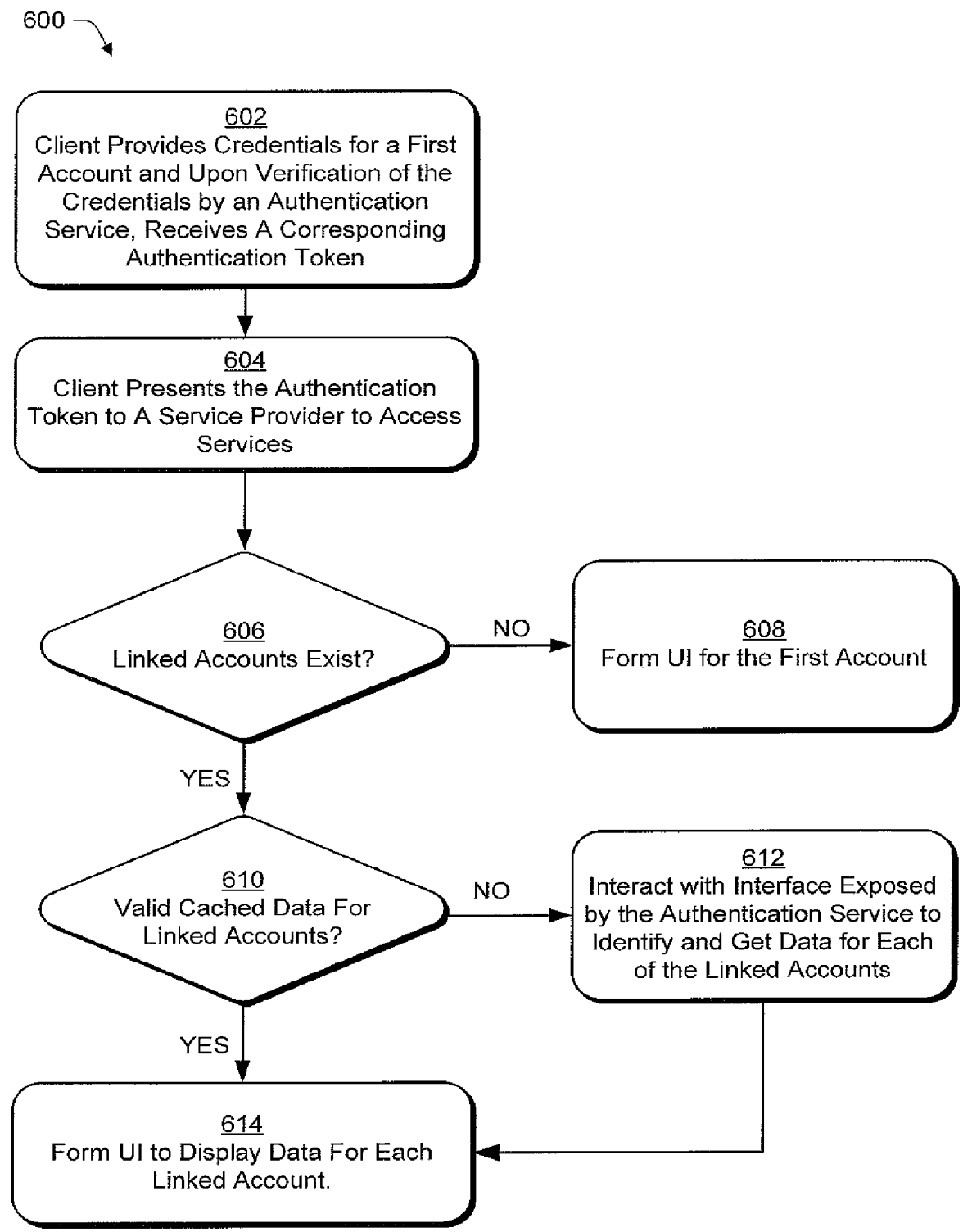
FIG. 6 depicts a procedure in an exemplary implementation in which a service provider utilizes account linking data provided in an authentication token to render a user interface for interaction with multiple linked accounts.
Figure 7:
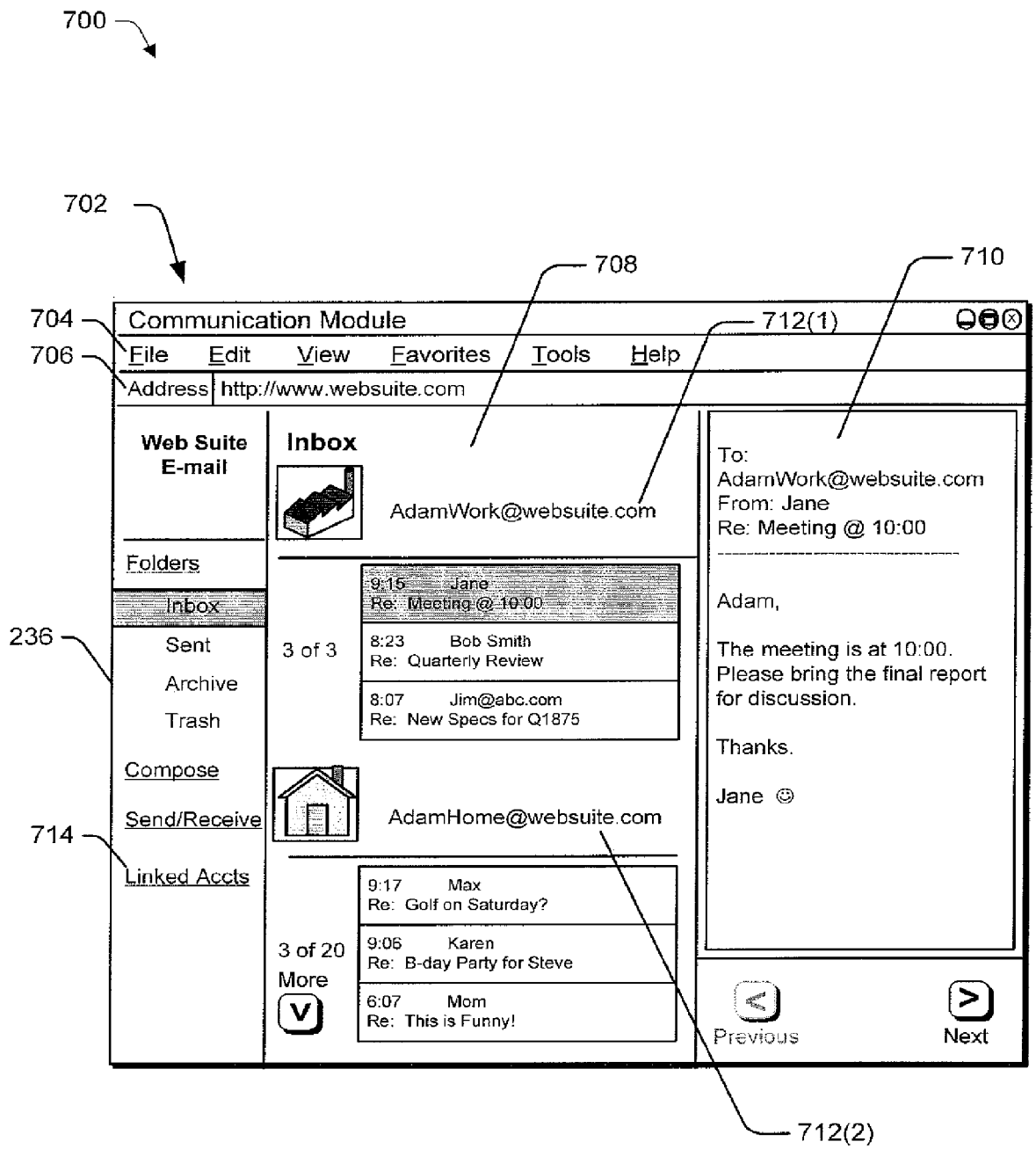
FIG. 7 illustrates an exemplary implementation of a user interface of FIG. 2 that may be generated for client interaction with linked accounts.
Figure 8:
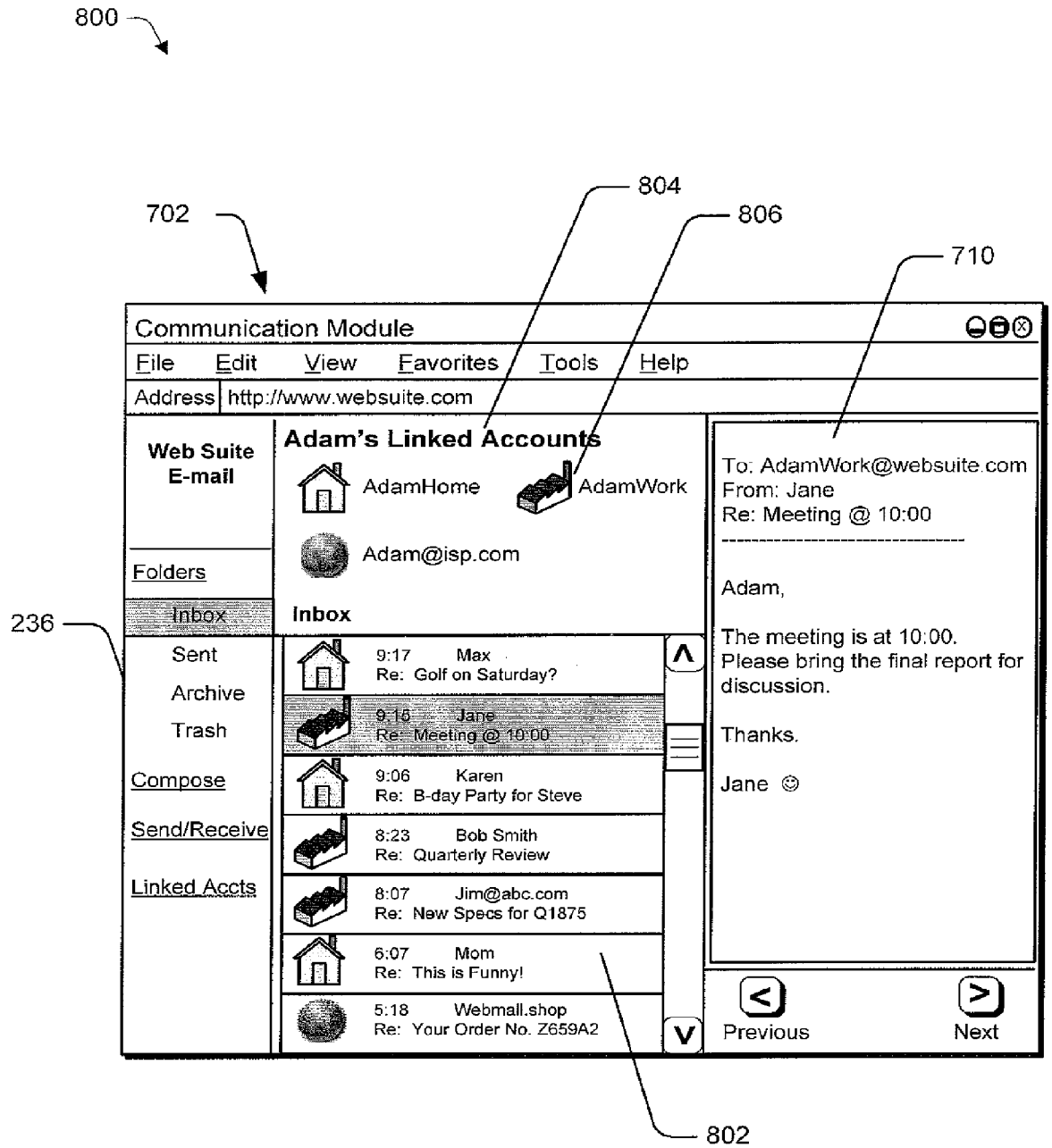
FIG. 8 illustrates another exemplary implementation of a user interface of FIG. 2 that may be generated for client interaction with linked accounts.

FIG. 6 depicts a procedure 600 in an exemplary implementation in which a service provider utilizes account linking data provided in an authentication token to render a user interface for linked accounts. In discussing procedure 600, reference may also be made to the exemplary user interfaces which are depicted in FIGS. 7 and 8.

A client provides credentials for a first account and upon verification of the credentials, receives a corresponding authentication token (block 602). Then, the client presents the token to a service provider to access services (block 604). In an implementation, service provider 120(m) as in FIG. 2 may utilize an authentication token 230 provided by a client 102 to determine which services 124(s) the client 102 is authorized to receive (e.g., to provide the clients identity). Further, the service provider 120(m) may utilize the authentication token 230 to provide access to linked accounts, when a link relationship exists.

A determination is made as to whether linked accounts exist (block 606). For instance, when there is no linking data in the authentication token 230, the service provider 120(m) may determine that the first account is not linked to other accounts. In this instance, the service provider may form a user interface for the first account (block 608). In other words, the client 102 is provided an interface to interact with services 124(s) and content for the first account, such as to interact with email, a instant messaging service, a shopping service and/or a variety of other services and data related to the first account. The user interface or data sufficient to form the user interface may be communicated to a client 102 via network 104, which may output the user interface, such as the user interface 236 of FIG. 2 depicted as output via communication module 108. When the authentication token 230 contains data to reference linked accounts, the service provider 120(m) detects this and in response may perform acts to provide access to the corresponding linked accounts.

For instance, when linked accounts exist, a determination is made whether valid data for linked accounts has been cached (block 610). In an implementation, a service provider 120(m) may be configured to maintain or cache certain account data 114, for example cached locally in memory 212(m). Such cached data may include the list of accounts associated with linking data; corresponding account profiles and preferences such as user tiles, display preferences, account ids; and a variety of other account data 114. The authentication token 230 as previously described may include a time stamp 234 which may indicate when a linked account relationship has been changed. Thus, the service provider 120(m) may determine based upon the time stamp 234 if cached data is stale and needs to be refreshed. Another technique to verify cached linked account data is to use a link hash 232 which may be configured as a hash of each account identifier in the linked relationship. Thus, the service provider may compare a cached hash to a hash 232 received via an authentication token 230 to validate the cached data and/or to understand when to obtain updated data for the linked relationship.

Thus, when data is not cached or is not valid (e.g., when it is determined that an update to the data is to be performed) service provider interacts with an interface exposed by the authentication service to identify and get data for each of the linked accounts (block 612). For instance, the authentication service 106 of FIG. 2 may incorporate a service provider interface 216 which is callable with certain account link data 116 to reference linked accounts and which returns data associated with the linked accounts. In response to a call from a service provider 120(m), the service provider interface 216 may return a variety of linked accounts data examples of which include but are not limited to a hash 232, time stamp 234, profile data 226, account ids 220, usernames 224, user tiles, and so forth. In an implementation, the service provider interface 216 may be provided as a part of the authentication manager 110 module of FIG. 2 or alternatively as a stand alone module. The service provider interface 216 may be configured as an application programming interface (API) accessible via the network 104. The service provider interface 216 (e.g., API) may further be configured for a particular communication protocol such as simple object access protocol (SOAP) or to employ other suitable client-server communication techniques. Thus, a service provider 120(m) may extract an link identifier 228 included in an authentication token 230 provided by a client 102, and may call the service provider interface 216 using the link identifier 228 to obtain data for associated linked accounts.

When data has been cached and is valid, or following an update of linked accounts data, the service provider forms a user interface to display data for each linked account (block 614). For instance, a service provider 120(m) may use data from a cache or obtained using the link identifier 228 to form a user interface for display of linked accounts, examples of which are shown in FIGS. 7-8.

FIG. 7 illustrates an exemplary implementation 700 of a user interface 236 of FIG. 2 that may be generated for client interaction with linked accounts. The user interface 236 provided by the service provider 120(m) in this instance is illustrated as incorporated within a user interface 702 for a communication module 108 of a client 102. For example, the communication module 108 may be configured as a browser that includes a menu bar 704 and an address bar 706. The menu bar 704 is a portion of the user interface 702 that includes drop-down menus of commands, examples of which are illustrated as "file", "edit", "favorites", "tools" and "help". The address bar 706 is configured to receive inputs to navigate to particular network addresses and/or display current network addresses, from which, the client 104(n) has received content and is being displayed.

The address bar 706 shows communication module 108 directed to a service provider 120(m) specifically "websuite.com". Websuite.com may be configured to provide a suite of services as previously discussed with respect to FIG. 1. In the implementation 700 of FIG. 7, interface 236 is depicted as email page for an email 124(2) service which may be provided by a service provider 120(m), e.g., websuite.com. The interface 236 may display email for multiple accounts 112(r) based upon the accounts 112(r) being linked as described herein. The interface includes an inbox 708 portion for listing of email messages and a display portion 710 to display a selected message. In an implementation, the inbox 708 may include e-mail messages from a plurality of linked accounts. In the illustrated example, assume a user "Adam" has accounts "AdamWork@websuite.com" and "AdamHome@websuite.com", which have been linked such as via Link API exposed by authentication service 106. The interface 236 has portions 712(1), 712(2) each corresponding to a one of the linked accounts. Each of portions 712(1), 712(2) displays data corresponding to their respective accounts such as the account name, email messages, a user tile (e.g., factory image for "AdamWork" and house image for "AdamHome"); and so forth. In an implementation, a portion 714 may be provided which is selectable to manage linked accounts, such as to access a Link APT or De-Link API to manage which accounts are linked.

Referring to FIG. 8 an exemplary embodiment 800 of another user interface for client interaction with linked accounts is shown. In this embodiment a user interface 236 configured for email is again shown, however separate portions for displaying email messages corresponding to each linked accounts are not provided. Rather, the messages are displayed together in a common inbox portion 802. The interface 236 may also include a portion 804 which indicates the set of linked accounts, in the depicted instance "AdarnIome", "AdamWork" and "Adam@isp.com". A respective user tile 806 or other identifier for each account may also be displayed in the user interface 236 to visually identify the accounts. For instance, the factory image corresponding to "AdamWork" is displayed in the portion 804 with the listed account name, and is also displayed with each corresponding message in the inbox 802 portion. The same is true for the house and globe images corresponding to "AdamHome" and "Adam@isp.com" respectively. A variety of other arrangements of user interfaces 236 to provide interactions with linked accounts and corresponding services 124(s) are also contemplated.

Figure 9:
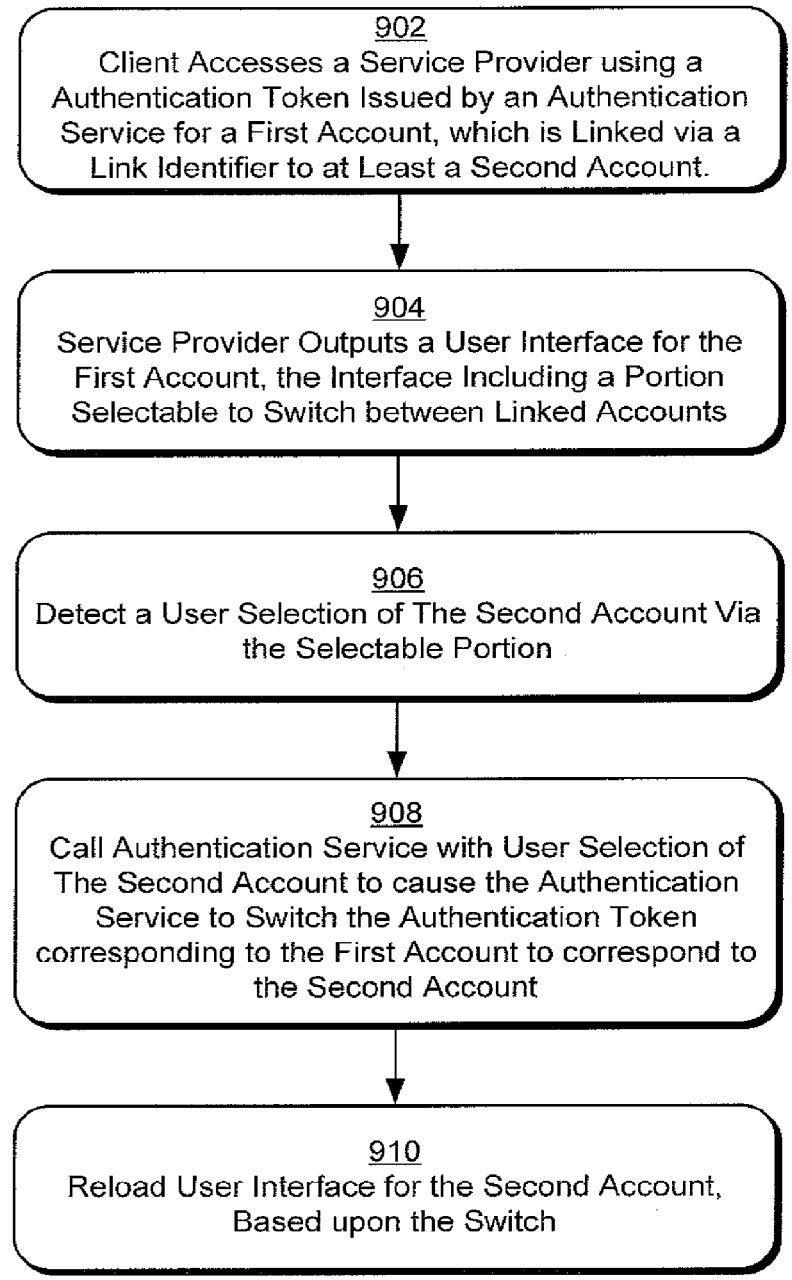
FIG. 9 depicts a procedure in an exemplary implementation in which an account switch between linked accounts may be performed via a user interface control exposed on a service provider user interface.
Figure 10:
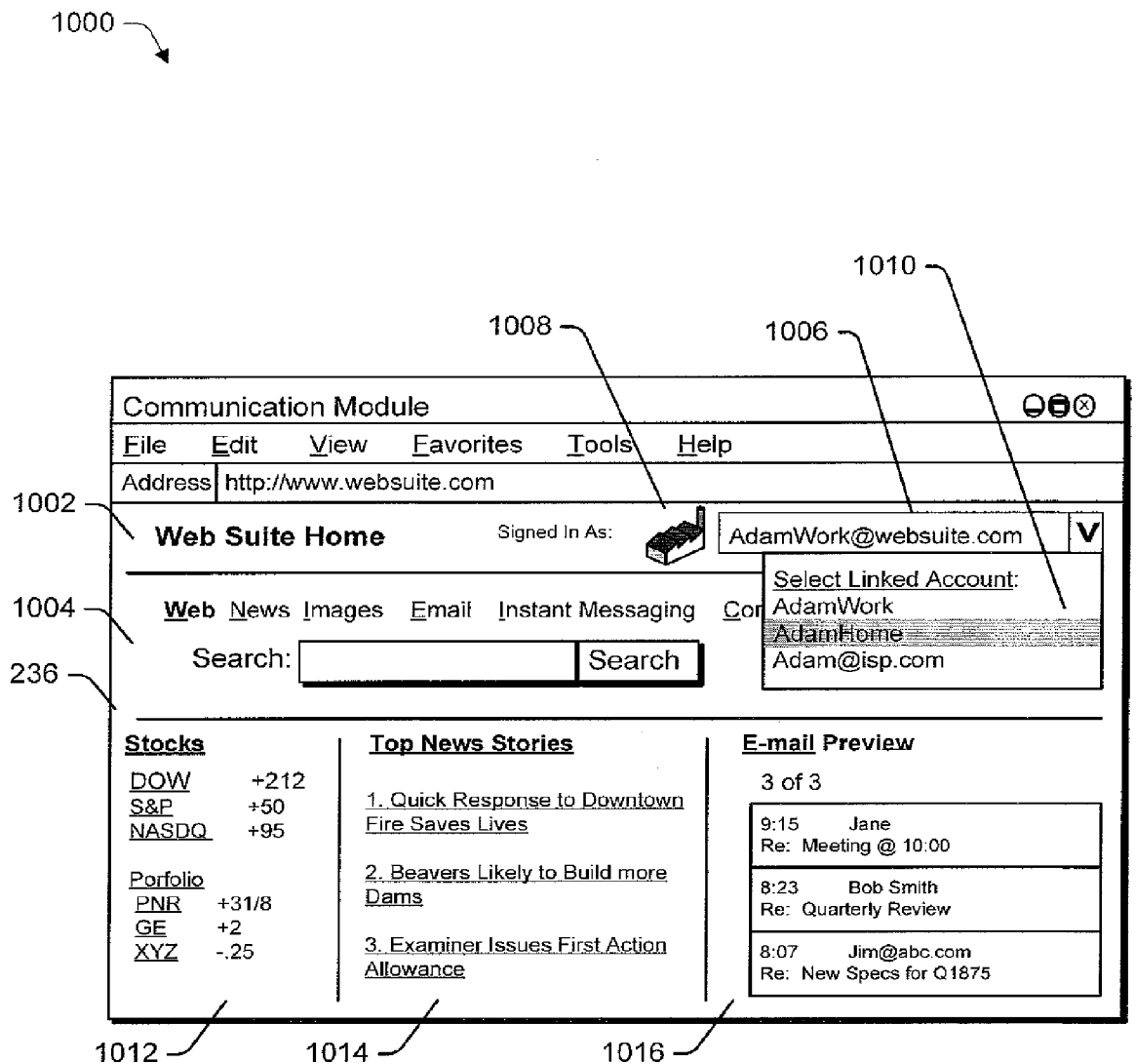
FIG. 10 depicts an exemplary implementation of a user interface including a switching control to switch between linked accounts.
Figure 11:
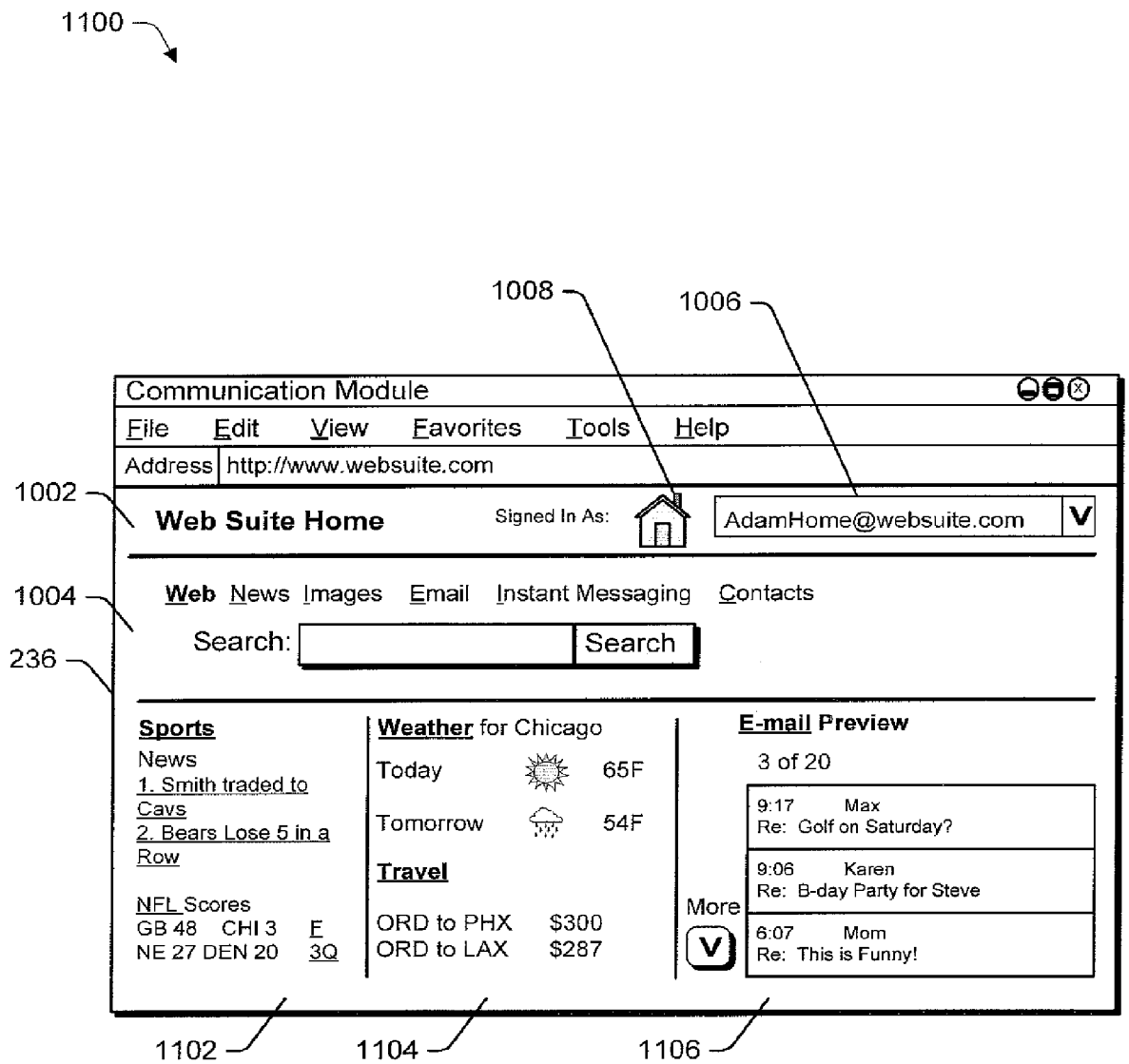
FIG. 11 depicts an exemplary implementation of a user interface following a switch from one account to another account via the switching control of FIG. 10.

FIG. 9 depicts a procedure 900 in an exemplary implementation in which an account switch between linked accounts may be performed, via a user interface switching control exposed on a service provider user interface. In discussing the procedure 900, reference may also be made to the exemplary user interfaces which are depicted in FIGS. 10 and 11. Thus, the exemplary procedure 900 is described in the context of switching between the user interface depicted in FIG. 10 and the user interface depicted in FIG. 11. Again consider a user "Adam" associated with three accounts "AdamHome", "AdamWork" and "Adam@isp.com". These accounts may be linked one to another in accordance with the techniques described herein. Thus, a link identifier 228 which is matched to an account id 220 for each one of "Adam's" accounts may be stored at an authentication service 106.

Referring back to FIG. 9 and procedure 900, a client may access a service provider using an authentication token issued by an authentication service for a first account, which is linked via a link identifier to at least second account (block 902). For example, "Adam", via a client 102 as in FIG. 2 may "sign-in" to one of the linked accounts such as "AdamWork" via the authentication service 106 and in response receives a corresponding authentication token 230 having the link identifier 228. "Adam" may then present the authentication token 230 corresponding to "AdarnWork" at one or more service providers 120(m) to access services 124(s). The authentication token 230 may include an account identifier 220 corresponding to "AdamWork" by which service providers 120(*m*) may understand that "Adam" has provided credentials corresponding to "AdamWork" which have been verified by the authentication service 106.

A service provider outputs a user interface for the first account, the interface including a portion selectable to switch between linked accounts (block 904). For instance, "Adam" may use the authentication token 230 to access one of service providers 120(*m*). The service provider 120(*m*) may form a user interface 236 for communication to the client 102, such that the client 102 may interact with provided services 124(*s*). The client 102 may then output the user interface 236 such as on a display device associated with the client 102.

Referring to FIG. 10, an exemplary implementation 1000 of a user interface 236 of FIG. 2 is depicted in greater detail, the user interface including a switching control to switch between linked accounts. A variety of different user interfaces 236 are contemplated which may correspond to different services 124(*s*) and/or service providers. In the implementation 1000 of FIG. 10, the interface 236 is depicted as a home page or start page of a service provider "websuite.com", which may be configured to provide a suite of service 124(*s*) as described with respect to FIG. 1. The interface 236 includes a header portion 1002 and a search portion 1004 to provide a variety of search functionality. Further, depicted in the header portion 1002 is a portion 1006 which displays a user account 112(*r*) for which the interface 236 has been rendered. In this case the account name "AdamWork@websuite.com" is shown. An icon or user tile 1008 may also be displayed to visually identify the account. In FIG. 10 a user tile 1008 is illustrated as a factory image corresponding to "AdamWork@websuite.com".

The interface 236 is also depicted as including a switching control 1010 portion selectable to switch between linked accounts. In the depicted implementation, the switching control 1010 portion is illustrated as a drop down list box control, surrounding the portion 1006 to display the selected account. The switching control 1010 portion is configured to list the set of accounts which are "linked". By way of example and not limitation, FIG. 10 shows a drop down list box control including the accounts "AdamHome", "AdamWork" and "Adam@isp.com". Thus, a user may make a selection of one of a set of linked accounts via the switching control 1010 portion. A variety of other arrangements of a switching control 1010 are also contemplated.

In an implementation, a service provider 120(*m*) may obtain a list of accounts to display in a switching control 1010 portion, as well as other data corresponding to linked accounts, through interaction with the authentication service 106. For instance, a service provider 120(*m*) may provide a link identifier 228 obtained from an authentication token 230 to an authentication service 106 via the service provider interface 216. In response the service provider 120(*m*) may obtain access to a variety of data for corresponding linked "accounts". This interaction based on the link identifier 228 may be user to populate the switching control 1010 portion with the list of linked accounts. Examples of data which may be obtained via service provider 120(*m*) interaction with the service provider interface 216 include but are not limited to a list of the linked accounts, account identifiers 220, associated user tiles, account profile data 226, content selections or preferences, and so forth.

A variety of content corresponding to the selected one of a set of linked accounts may also be displayed via the user interface 236. Thus, in FIG. 10 a variety of content portions are depicted including a stock portion 1012, a top news stories portion 1014 and a email preview portion 1016. A variety of other content portions and arrangements are also contemplated. Each of these portions may be displayed based upon the selected one of the linked accounts, and may include content specific to that account. For example, stock portion 1012 may display stocks indicated in preferences for "AdamWork@websuite.com". Likewise, the email preview portion 1016 displays email for the account "AdamWork@websuite.com."

Referring again to procedure 900 of FIG. 9, a selection of a second account via the user interface portion is detected (block 906). For example, user "Adam" after interacting with "AdamWork@websuite.com" may wish to access another one of his accounts such as "AdamHome@websuite.com." Thus "Adam" may make a corresponding selection of one of the linked accounts in a portion exposed in the user interface 236 of the preceding example. For instance, in FIG. 10 the switching control 1010 portion shows the account "AdamHome" highlighted to represent a selection of that account by a user, e.g., "Adam".

The service provider detects the selection and calls the authentication service with the user selection of the second account to cause the authentication service to switch the authentication token corresponding to the first account to correspond to the second account (block 908). For example, the selection of "AdamHome" via the switching control portion 1010 of the previous example may be detected via functionality incorporated with the service manger module 112 which is illustrated in FIG. 2 as executed on a respective processor 206(*m*) of a service provider 120(*m*). Service manger module 112 may then call the authentication service 110 to communicate the user selection of "AdamHome". For instance, service manager module 112 may communicate via the service provider interface 216 data identifying the selection, such as an account identifier 220 corresponding to "AdamHome". Upon receiving the selection of "AdamHome", the authentication service 106, in response, may perform a switch between linked accounts. For example, the service provider interface 216 may operate to cause a switch between the initially authenticated account "AdamWork" and the account "AdamHome" selected via the switching control portion 1010.

In an implementation, a switch between linked accounts includes updating an authentication token 230 issued for a first account to correspond to the selected account. This switch may occur based upon the link relationship and without credentials being provided for the selected account. Further, the switch may involve overwriting account specific data in the authentication token 230 with data for the selected account. For instance, the authentication token 230 issued upon "Adam" signing-in to the account "AdamWork", may be overwritten with data corresponding to "AdamHome" such that the token 230 now corresponds to "AdamHome". A variety of data in an authentication token 230 may be overwritten in response to a selection via switching control portion 1010. For instance, an account identifier 220 included in an authentication token 230 which corresponds to a first account "AdamWork" may be overwritten with an account identifier 220 corresponding to the second account, e.g., the selected account "AdamHome".

Further, the switch may extend to include updating of a variety of other authentication data, such as overwriting one or more other authentication tokens issued upon authentication of a client 102 to a first account, updating cached data at the client 102 or maintained at one or more service providers 120(*m*), updating data stored by the authentication service 106 and/or updating other data associated with the initial authentication of client 102 to the first account, "AdamWork". In this manner, an authentication switch between an initially authenticated account and an associated linked account may be performed throughout an entire domain (e.g., all of websuite.com) and/or for a set of domains or participating sites (e.g., service providers 120(*m*)). Thus, a client 102 may use the updated authentication token 230 which now corresponds to "AdamHome" to interact with corresponding services 124(*s*) throughout the domain and/or at each of the participating sites.

In an implementation, the authentication service 106 provides functionality to switch between linked accounts via a uniform resource locator (URL). For instance, service provider interface 216 may be configured to expose a URL which is accessible via the network 104 to service providers 120(*m*) and/or a client 102 to initiate a switch between linked accounts. As noted, the switching control 1010 may be populated with data for linked accounts by calling service provider interface 216 with a link identifier 228 extracted from an authentication token 230. Each account listed in the switching control 1010 may also be associated with an account identifier 220 which may be returned with the list of linked accounts. When the user interacts with the switching control 1010 to switch to another account, the corresponding account identifier 220 is provided to the URL exposed by the authentication service 106 to cause the switching. The data is then processed via the URL to cause the switching. This may include validating the link between the accounts (e.g., verifying the provided account data), identifying data to be updated, performing the update, returning the updated data and/or confirmation, and causing a reload or refresh of the user interface 236 through which the switch was initiated.

Optionally for added security, a version of the account identifier 220 other than the account identifier 220 itself may be utilized to cause switching via the URL. In this manner, the account identifier 220 is not exposed to being intercepted via the network 104. In an implementation, the data provided to initiate switching may be a one-way hash of the account identifier 220. A one-way hash of an account identifier 220 for each of the linked accounts may be provided by the authentication service 106 when the switching control 1010 is populated. The one-way hash may be configured to be decoded by the authentication service 102 to identify a corresponding account identifier 220. However, the service provider 120(*m*) or individuals who might intercept the one-way hash may not be able to identify the corresponding account 112(*r*). This may introduce a simple but effective level of security between the service providers 120(*m*) and the switching functionality of the URL, without the service providers 120(*m*) having to undertake complex encryption techniques, or other redesign to implement a secure communication protocol.

Then, the user interface is reloaded for the second account, based upon the switch. (block 910). For instance, following the switch by the authentication service, the authentication token 230 will now correspond to the account selected via the switching control 1010 portion of FIG. 10. The selection via switching control 1010 portion may be configured to cause a page reload or refresh of the user interface 236 to occur. Upon reload or refresh, the user interface 236 will now correspond to the selected account, for instance the account "AdamHome" in the example given above.

Referring to FIG. 11 an exemplary implementation 1100 of a user interface 236 is illustrated following a switch between accounts, in accordance with procedure 900 of FIG. 9. For instance, In FIG. 11, the portion 1006 now displays the account "Adamhome@websuite.com". Further, the user tile 1008 has been updated to display a house image corresponding to the account "Adamhome@websuite.com". In addition, the user interface 236 now has content portions corresponding to the selected one of the linked accounts, e.g., "Adamhome@websuite.com". Thus, a sports portion 1102 and a weather/travel portion 1104 which may correspond to preferences for "Adamhome@websuite.com" are now displayed. Further, an email preview portion 1106 displays email for the account "AdamHome@websuite.com."

It is noted that the switch between linked accounts, such as from the user interface in FIG. 10 to that of FIG. 11, may occur without the additional credentials being provided by the user "Adam" via a corresponding client 102. Thus, a client 102 and/or user (e.g., "Adam") may access services for a linked account (e.g., "AdamHome@websuite.com") based upon a linked account relationship without providing credentials to "sign-in" to the account. This switching control 1010 technique may permit participating sites that may already support token based authentication to support linked accounts, without significant redesign of content such as redesign of web pages, interfaces, infrastructure, protocols and so forth. The switching control 1010 may be added to existing pages and then the actual switching functionality is performed via the authentication service 106. To the participating sites, the switching between linked accounts is understood in the same manner as if a different authentication token 230 for a different account had been presented. The site responds by providing corresponding service 124(*s*) when the reload of the user interface 236 occurs. Thus, the techniques for overwriting authentication tokens 230 and data may permit partner sites to understand and support linked accounts without much work on the part of the partner sites. Following a switch between linked accounts, it will look to the partner sites like another user account (the selected account) has been is authenticated. Sites wishing to provide even greater support for linked accounts, may additionally or alternative choose to develop user interfaces for displaying linked accounts such as discussed with respect to FIGS. 6-8. Thus, different service providers 120(*m*) may choose different levels of support for authenticating linked accounts techniques described herein.

CONCLUSION

Although embodiments of authenticating linked accounts have been described in language specific to features and/or methods, it is to be understood that the subject of the appended claims is not necessarily limited to the specific features or methods described. Rather, the specific features and methods are disclosed as example implementations of authenticating linked accounts.

What is claimed is:
1. A method comprising:
  receiving one or more inputs from a client that define a link between a plurality of user accounts at a plurality of service providers;
  forming a link identifier that identifies a plurality of account identifiers corresponding to the plurality of user accounts as a set of linked accounts;
  storing the link identifier at an authentication service;
  forming an authentication token for communication to a client, the authentication token including the link identifier to reference the set of linked accounts; and
  managing authentication of the client to the set of linked accounts, such that the client, upon providing to the authentication service credentials corresponding to one account in the set of linked accounts, receives an access to each account in the set of linked accounts, wherein the link identifier permits the plurality of service providers presented with the authentication token to use the authentication token as proof of the client's identity to identify the set of linked accounts.

2. The method as recited in claim 1, wherein:
the authentication service manages authentication of clients on behalf of a plurality of service providers; and
the access to each account in the set of linked accounts includes access to corresponding services provided by the plurality of service providers.

3. The method as recited in claim 1, further comprising:
exposing an application programming interface callable by the client;
indicating a plurality of user accounts that are linkable to one another by the client; and
storing the link identifier in response to an indication linking more than one of the user accounts received from the client via the interface.

4. The method as recited in claim 1, wherein, the link identifier permits access to services corresponding to each account described by the link identifier without additional authentication of the client.

5. The method as recited in claim 1, wherein managing authentication of the client comprises:
exposing one or more interfaces; and
receiving input from the client through the one or more interfaces as client interaction with the set of linked accounts.

6. The method as recited in claim 5, wherein the one or more interfaces comprise:
an application programming interface, callable by the client, indicative of a plurality of accounts that are linkable to one another by the client; and
an additional application programming interface, callable by the client, indicative of at least one link that is removable from the set of linked accounts by the client.

7. The method as recited in claim 1, wherein managing authentication of the client comprises:
exposing one or more interfaces; and
permitting interactions of one or more service providers with the set of linked accounts through the one or more interfaces.

8. The method as recited in claim 7, wherein the one or more interfaces comprise an application programming interface that:
receives from one of the plurality of service providers the link identifier obtained by the one of the service providers from an authentication token provided by the client; and
provides the one of the plurality of service providers access to data corresponding to the set of linked accounts which are linked via the link identifier.

9. The method as recited in claim 7, wherein the one or more interfaces comprise one or more interfaces that:
receive from one of the plurality of service providers the link identifier obtained by the one of the service providers from an authentication token provided by the client, the authentication token correlated to a first account in the set of linked accounts, the authentication token issued to the client by the authentication service upon verification of credentials for the first account provided by the client;
identify the set of linked accounts based on the link identifier;
select one of the set of linked accounts;
receive from the one of the plurality of service providers a user selection of a second account in the set of linked accounts; and
correlate the authentication token to the second account.

10. The method as recited in claim 9, wherein correlating the authentication token to the second account comprises overwriting an account identifier of the first account in the authentication token with an account identifier of the second account.

11. The method as recited in claim 10 wherein:
when the authentication token correlates to the first account, the one of the plurality of service providers provides services to the client corresponding to the first account; and
when the authentication token correlates to the second account, the one of the service providers provides services to the client corresponding to the second account.

12. The method as recited in claim 9, wherein the act of correlating the authentication token to the second account comprises correlating the authentication token to the second account without additional credentials being provided.

13. One or more computer readable memory devices comprising computer executable instructions which, when executed, direct an authentication server to:
expose an interface accessible by a client over a network;
receive an input from the client via the interface that defines a link between a plurality of user accounts at a plurality of service providers;
form a link identifier that identifies the plurality of user accounts as a set of linked accounts;
store the link identifier;
receive a single sign-in of the client to one account in the set of linked accounts;
form an authentication token that includes the link identifier to reference the set of linked accounts; and
manage authentication of the client to the set of linked accounts, such that the client, upon providing to the authentication service the single sign-in corresponding to the one account in the set of linked accounts, receives access to each account in the set of linked accounts,
wherein the link identifier permits the plurality of service providers presented with the authentication token to use the authentication token as proof of the client's identity to identify the set of linked accounts.

14. One or more computer readable memory devices as recited in claim 13, wherein the link identifier included in the authentication token permits the client to access services from one or more service providers corresponding to each of the accounts in the set of linked accounts with the single sign-in.

15. One or more computer readable memory devices as recited in claim 13, further comprising instructions to direct the authentication server to:
receive the link identifier via the network from a service provider, the link identifier obtained by the service provider to which the client presents the authentication token for proof of identity to access corresponding services; and
provide the service provider access to data corresponding to the set of linked accounts, the data utilized by the service provider to output a user interface for the client to interact with the set of linked accounts.

16. A method comprising:
receiving, via a network from a client, an authentication token issued by an authentication service to the client, the authentication token including a link identifier that identifies a plurality of user accounts at a plurality of service providers as a set of linked accounts via the authentication service, the authentication token further corresponding to a first account in the set of linked accounts, each of the plurality of user accounts corresponding to a service with which the client is permitted to interact, each of the plurality of user accounts including a user profile, the link identifier permitting the plurality of service providers presented with the authentication token to use the authentication token as proof of the client's identity to identify the set of linked accounts;

outputting an indication of services corresponding to the first account; providing a selectable portion in a user interface permitting selection of a second account in the set of linked accounts identifiable via the link identifier;

receiving a selection of the second account via the selectable portion;

communicating the selection of the second account to the authentication service;

receiving an indication that the authentication token has a change to correspond to the second account, the change including an account identifier of the first account in the authentication token overwritten with an account identifier of the second account; and outputting an indication of services corresponding to the second account.

17. The method as recited in claim 16, wherein the authentication token is changed to correspond to the second account without additional credentials being provided.

18. The method as recited in claim 16, wherein the authentication token includes the account identifier of the first account when the authentication token corresponds to the first account, and wherein the authentication token includes the account identifier of the second account when the authentication token corresponds to the second account.

19. The method as recited in claim 1, wherein the authentication token includes a time stamp to determine when the authentication token expires or to determine when one of the set of linked accounts needs updating.

20. The method as recited in claim 1, wherein the access to each account in the set of linked accounts includes access to each account without providing to the authentication service credentials corresponding to each account except for the credentials provided to the authentication service corresponding to the one account in the set of linked accounts.

21. The method as recited in claim 1, wherein the plurality of user accounts include two or more user accounts of a same type of service.

22. The method as recited in claim 1, wherein the plurality of user accounts include two or more user accounts of a different type of service.

* * * * *